(12) United States Patent
Woida-O'Brien (10) Patent No.: US 9,678,545 B2
(45) Date of Patent: Jun. 13, 2017

(54) ADDITIVE ELX AND MECH INTERFACES FOR ADAPTING TO COTS PLUG-AND-PLAY VARIANCE

(71) Applicant: Raytheon Company, Waltham, MA (US)

(72) Inventor: Rigel Woida-O'Brien, Tuscon, AZ (US)

(73) Assignee: RAYTHEON COMPANY, Waltham, MA (US)

( * ) Notice: Subject to any disclaimer, the term of this patent is extended or adjusted under 35 U.S.C. 154(b) by 71 days.

(21) Appl. No.: 14/464,878

(22) Filed: Aug. 21, 2014

(65) Prior Publication Data

US 2016/0056555 A1 Feb. 25, 2016

(51) Int. Cl.
*H05K 7/00* (2006.01)
*G06F 1/18* (2006.01)

(52) U.S. Cl.
CPC .................................. *G06F 1/183* (2013.01)

(58) Field of Classification Search
CPC . H01R 12/7076; H01R 12/716; H01R 43/205
USPC ................. 361/788, 761, 760, 792
See application file for complete search history.

(56) References Cited

U.S. PATENT DOCUMENTS

| | | |
|---|---|---|
| 2001/0019276 A1 | 9/2001 | Yoshida et al. |
| 2002/0086916 A1 | 7/2002 | Morrison et al. |
| 2002/0186030 A1 | 12/2002 | Yoshida et al. |
| 2003/0194506 A1 | 10/2003 | Drzal et al. |
| 2004/0070397 A1 | 4/2004 | Seeber et al. |
| 2004/0160236 A1 | 8/2004 | Yoshida et al. |
| 2004/0165244 A1* | 8/2004 | Seeley ..................... G01D 5/28 359/223.1 |
| 2004/0211593 A1 | 10/2004 | Willard et al. |
| 2005/0001641 A1 | 1/2005 | Yoshida et al. |
| 2005/0001642 A1 | 1/2005 | Yoshida et al. |
| 2005/0001643 A1 | 1/2005 | Yoshida et al. |
| 2005/0001644 A1 | 1/2005 | Yoshida et al. |
| 2005/0007130 A1 | 1/2005 | Yoshida et al. |
| 2005/0009952 A1 | 1/2005 | Qian et al. |
| 2005/0069804 A1 | 3/2005 | Qian et al. |
| 2005/0069805 A1 | 3/2005 | Qian et al. |
| 2005/0069806 A1 | 3/2005 | Qian et al. |
| 2005/0262221 A1* | 11/2005 | Daniels .................. G01D 11/24 709/219 |
| 2006/0182453 A1 | 8/2006 | Arai |
| 2006/0184336 A1 | 8/2006 | Kolen |
| 2007/0219744 A1 | 9/2007 | Kolen |
| 2007/0276641 A1 | 11/2007 | Murugan et al. |
| 2008/0101049 A1* | 5/2008 | Casto ....................... G06F 1/18 361/788 |
| 2008/0298029 A1 | 12/2008 | Park |

(Continued)

*Primary Examiner* — Yuriy Semenenko (57) ABSTRACT

Product-to-product variation, routing conflicts and undocumented product design changes in commercial off-the-shelf components are accommodated using additive manufacturing to modify interfaces for such components on a pre-fabricated component connection and interface structure. Radio frequency waveguides, printed circuit structures and additive twisted pair technology allow adaptive re-routing or shielding of signal lines on the design of the interface structure. Connectors and signal routing for power, radio frequency signals, and data signals may be adapted to enable interoperability of the off-the-shelf components.

20 Claims, 4 Drawing Sheets

(56) References Cited

U.S. PATENT DOCUMENTS

| | | |
|---|---|---|
| 2008/0299476 A1 | 12/2008 | Ashley et al. |
| 2008/0310135 A1 | 12/2008 | Schack et al. |
| 2009/0111040 A1 | 4/2009 | Veregin et al. |
| 2009/0142691 A1 | 6/2009 | Peter et al. |
| 2009/0148786 A1 | 6/2009 | Ashley et al. |
| 2009/0155705 A1 | 6/2009 | Jones et al. |
| 2009/0220880 A1 | 9/2009 | Moffat et al. |
| 2012/0049877 A1 | 3/2012 | Rathburn |
| 2012/0199985 A1 | 8/2012 | Rathburn |
| 2012/0202364 A1* | 8/2012 | Rathburn ................. H05K 3/32 439/91 |
| 2012/0206889 A1* | 8/2012 | Norman ................. H01L 23/50 361/761 |
| 2012/0307465 A1 | 12/2012 | Schreffler |
| 2012/0312589 A1 | 12/2012 | Balcome et al. |
| 2013/0330942 A1 | 12/2013 | Rathburn |
| 2014/0043782 A1 | 2/2014 | Rathburn |
| 2014/0092596 A1 | 4/2014 | Deutsch et al. |
| 2014/0362553 A1* | 12/2014 | Scally .................... H01R 12/73 361/792 |

\* cited by examiner

ADDITIVE ELX AND MECH INTERFACES FOR ADAPTING TO COTS PLUG-AND-PLAY VARIANCE

TECHNICAL FIELD

The present disclosure is directed in general to rapid integration of various components from different suppliers using nominally standardized interfaces, and more particularly, to improving low cost systems built from such components using adapters easily customized to either systematic or individual component variances interfering with reliable plug-and-play operation.

BACKGROUND OF THE DISCLOSURE

Commercial off-the-shelf (COTS) components are commonly employed to build up larger, more capable systems within limited budgets. One of the main risks of this strategy is the large number of unknowns and variations in the products themselves. In some situations, use of COTS components could defeat the cost advantages of employing such hardware if the developer becomes stuck in a repeated design spin or experiences part obsolescence problems due to disparate development cycles for aerospace versus commercial products.

There is, therefore, a need in the art for improved adaptation of COTS components during use in evolving designs.

SUMMARY OF THE DISCLOSURE

The present disclosure enables rerouting of electrical signals and formation of electrical interfaces that allow use of different versions of the same COTS component and/or adaptation to configuration variances on a lot-to-lot basis. Product-to-product variation, routing conflicts and undocumented product design changes in COTS components are accommodated using additive manufacturing to modify interfaces for such components on a pre-fabricated component connection and interface structure. Radio frequency waveguides, printed circuit structures and additive twisted pair technology allow adaptive re-routing or shielding of signal lines on the design of the interface structure. Connectors and signal routing for power, radio frequency signals, and data signals may be adapted to enable interoperability of the off-the-shelf components.

Although specific advantages have been enumerated above, various embodiments may include some, none, or all of the enumerated advantages. Additionally, other technical advantages may become readily apparent to one of ordinary skill in the art after review of the following figures and description.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below. Additionally, unless otherwise specifically noted, articles depicted in the drawings are not necessarily drawn to scale.

Certain COTS components employ nominally standardized electrical and mechanical signal interfaces for printed circuit boards (PCBs) and/or circuit card assemblies (CCAs). Actual implementations of such "standard" signal interfaces tend to exhibit significant variances, often interfering with other signals at mating interconnects. By way of example, PC/104 (also known as "PC104") is a consortium-promulgated standard defining the form factor and signal characteristics for a computer bus intended for specialized computing applications that depend upon reliable data acquisition despite extreme environments. Rather than connecting using a backplane, PC/104 modules may be stacked together like building blocks, with boards carrying the connectors held in position relative to each other using corner mounting holes and standoffs, to achieve more rugged assemblies than typical bus connections. Modules with PC/104 interconnects should be plug-and-play interoperable with each other. However, under the PC/104 standard, sufficient room for interpretation exists to result in components from different suppliers exhibiting many conflicts when the hardware is used together.

Figure 1A:
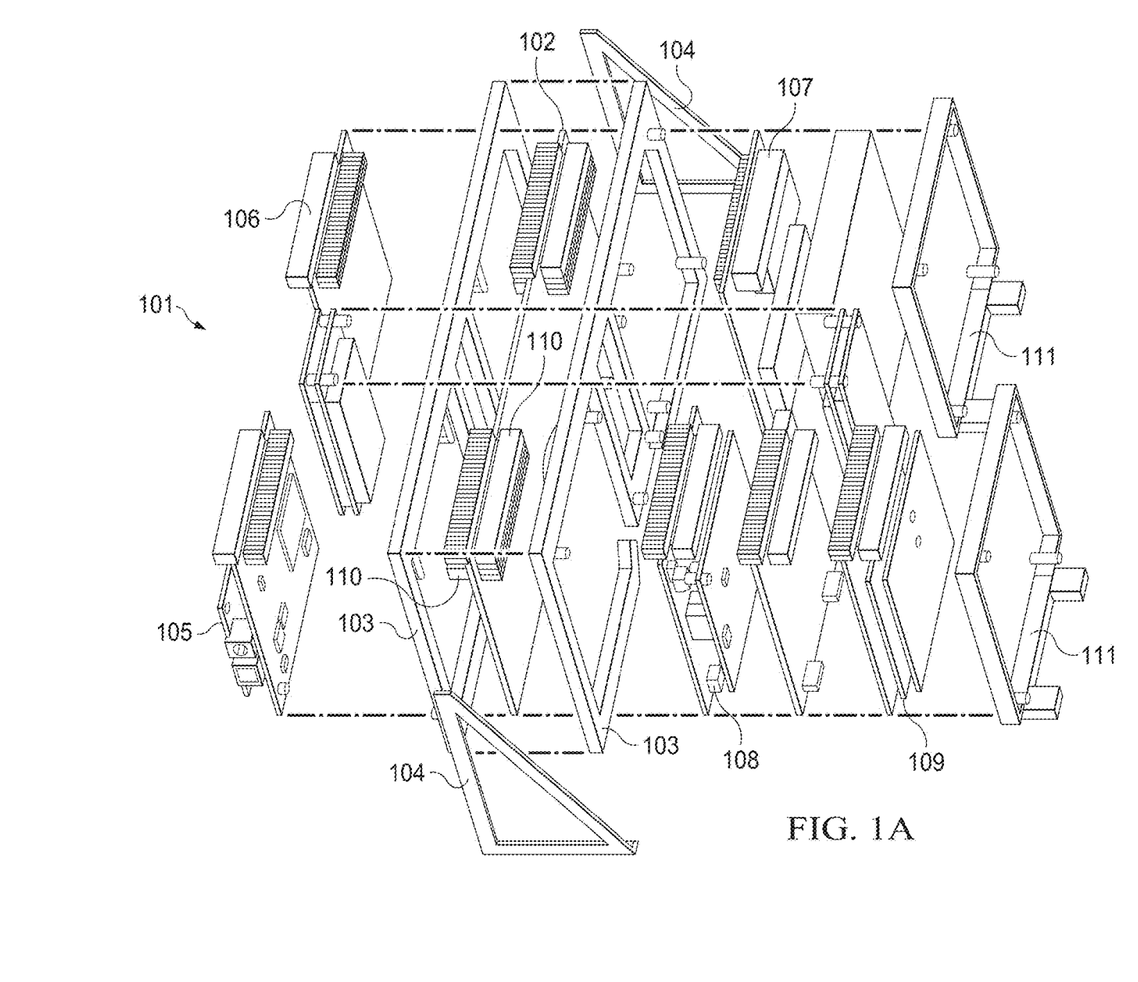
FIGS. 1A and 1B are perspective views of a mission card structure with additive electrical and mechanical interfaces adapting COTS components for interoperability despite plug-and-play variances in accordance with embodiments of the present disclosure.
Figure 1B:
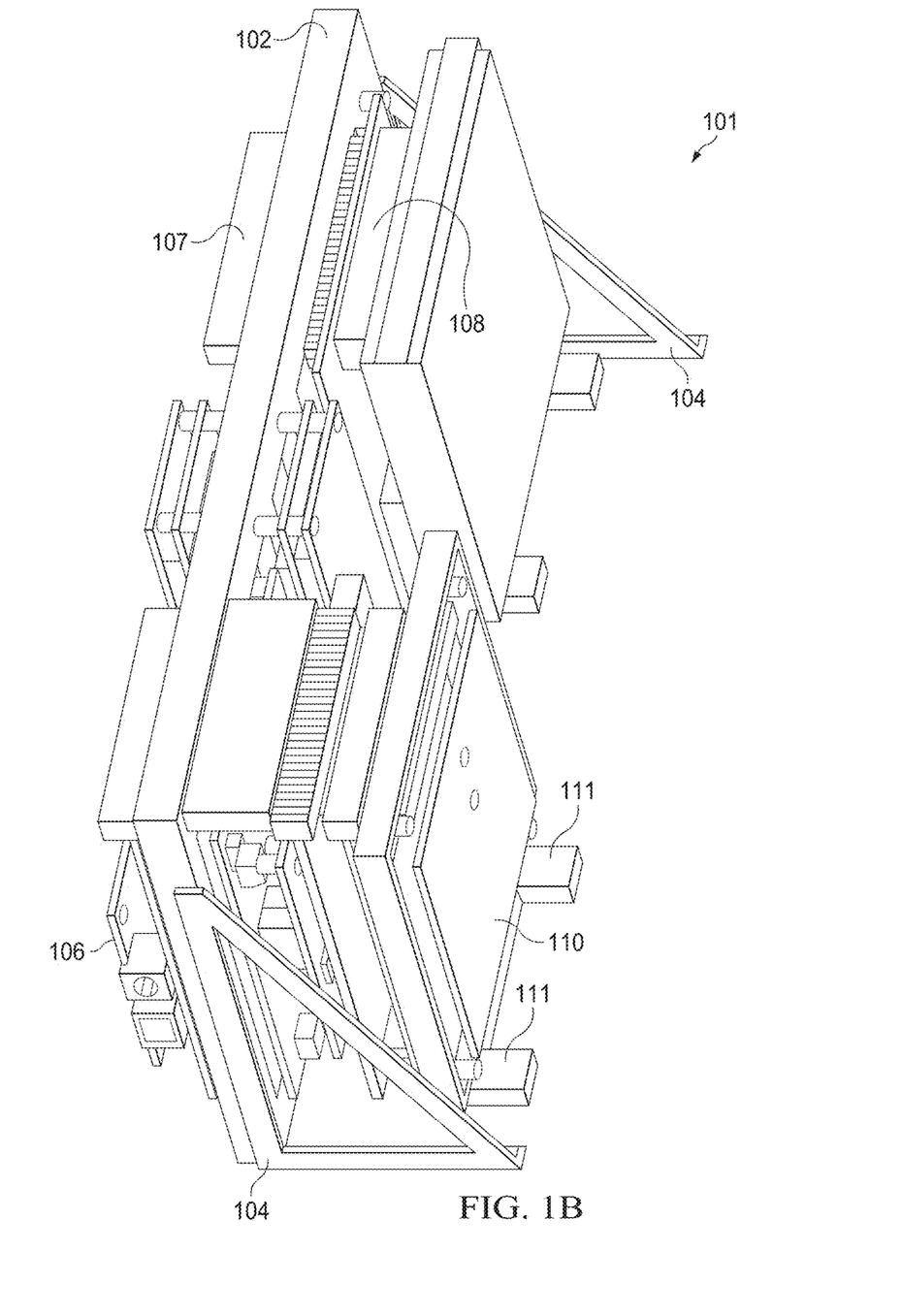

FIGS. 1A and 1B are perspective views of a mission card structure for additive electrical and mechanical interfaces adapting COTS components for interoperability despite plug-and-play variances in accordance with embodiments of the present disclosure. FIG. 1A is an exploded view and FIG. 1B is an assembled view of the mission card structure 101. In the example illustrated, a mission board 102, formed as discussed in further detail below, is held between two sandwich frames 103 that are supported by gussets 104 within an enclosure (not shown) of, for example, a space borne vehicle. The mission board 102 serves as an interface for various COTS modules 105, 106, 107, 108 and 109, each of which provides functionality used as part of a larger system. Accordingly, the COTS modules 105, 106, 107, 108 and 109 must interoperate correctly, based upon signals exchanged between the modules.

Mission board 102 includes connectors 110, which are offset PC/104 connectors in the exemplary embodiment, for use in eliminating mechanical or electrical issues in signals between those COTS components. Certain ones of the COTS modules 105, 106, 107, 108 and 109 must deliver signals to or receive signals from other ones of those components. For instance, in the example shown, COTS module 105 must receive signals from and/or deliver signals to COTS module 108, and COTS module 106 must receive signals from and/or deliver signals to COTS module 107.

Because of variances from one supplier to another in the implementation of "standard" signal interfaces, unacceptably high fault rates may occur in the exchange of signals if those components were connected directly. In some cases, electrical interference from adjacent signals might prevent reliable data exchange, while in other instances mechanical connections may not be sufficient to ensure accurate signal transfer.

At least a portion of the mission board 102 is formed by additive manufacturing techniques, such as 3D printing, ink jet printing and/or laser sintering. Techniques for using additive manufacturing to form harnesses having printed wiring traces and electrical connectors are described in U.S. Non-Provisional application Ser. No. 14/146,356 filed Jan. 2, 2014 and entitled "ADAPTIVE COMMUNICATION CABLE AND AD HOC HARNESSES," the content of which is incorporated herein by reference. Such techniques include formation of 3D twisted pair wiring by additive manufacturing to provide null electromagnetic fields necessary for accurate transmission of certain types of signals, or for transmission of such signals within a short distance from other signal lines or components, including especially radio frequency (RF) signals.

Variances in COTS components may be either systematic to all components of a given design or individual to a particular component of the design. Systematic variances result from the design's implementation of the standard under disparate acceptable interpretations of the standard's requirements, while individual variances result from inevitable differences from one component to another within manufacturing tolerances. As described in the above-referenced patent document, even individual variances may be detected and accounted for using additive manufacturing.

The mission card structure 101 of the exemplary embodiment also includes stack supports 111 to facilitate stacking more than one COTS component over another in relation to the mission board 102, allowing multiple COTS components to overlie a single region on the mission board 102 which being functionally connected to the remainder of the system.

Figure 2:
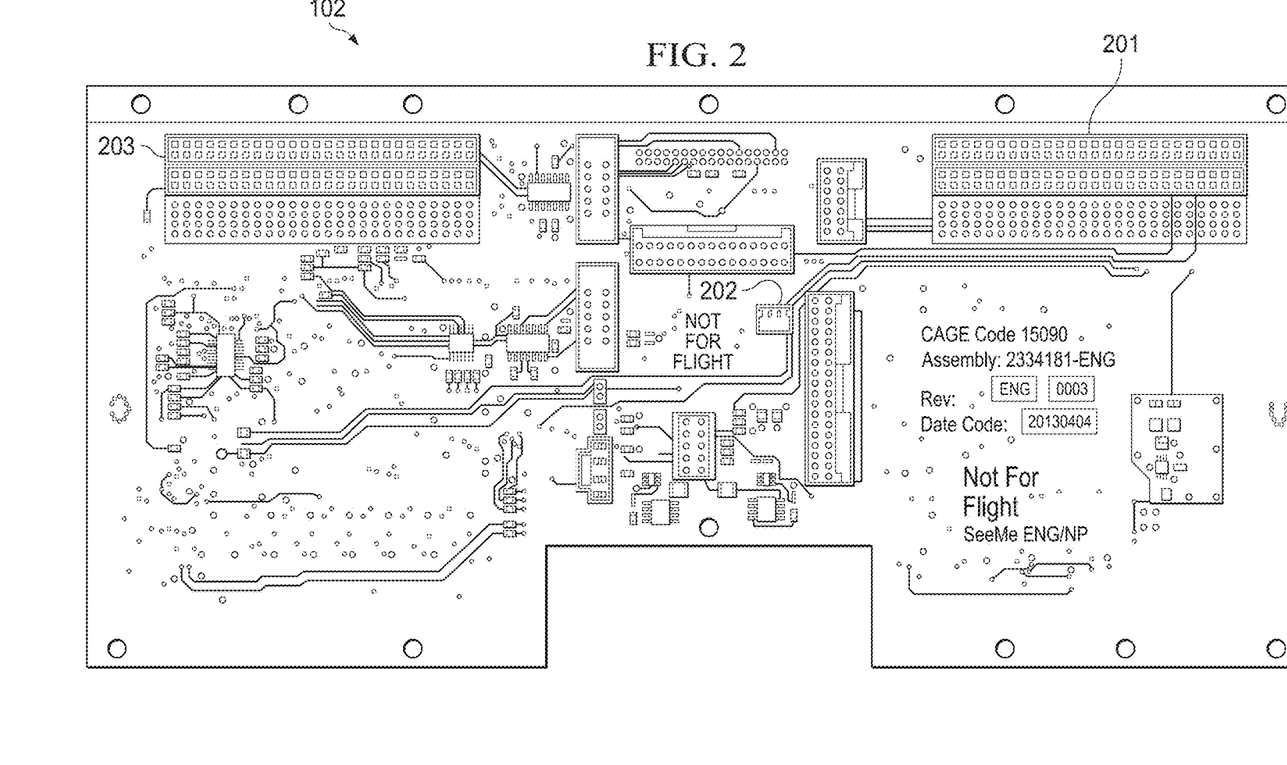
FIG. 2 is a plan view of a mission board with additive electrical and mechanical interfaces adapting COTS components for interoperability despite plug-and-play variances in accordance with embodiments of the present disclosure.

FIG. 2 is a plan view of a mission board with additive electrical and mechanical interfaces adapting COTS components for interoperability despite plug-and-play variances in accordance with embodiments of the present disclosure. Much of the mission board 102 may be formed ("pre-fabricated") by conventional manufacturing techniques, including the general wiring routing on the board. Of particular interest in finalization or customization of the mission board 102 in accordance with the present disclosure are the RF interface 201, the power connection 202, and the data interface 203. The data interface 203 may encompass, for example, universal serial bus (USB), Ethernet, I²C and/or RS-422 data connectivity, as well as other connectivity for other data communication protocols. Wiring for some or all signals to and from those connectors 201, 202 and 203 may be left "blank" upon the pre-fabricated version of the mission board 102. Alternatively, some portions of the wiring for such signals may be partially formed, with portions (e.g., the portions closest to the connectors 201, 202 and 203) left blank. In addition, the layout of the pre-fabricated version of mission board 102 may allocate space upon the surface for specific routing of connectors, such as extra space for routing signal lines with a specific spacing or formation of twisted pair wiring. Likewise, the connectors 201, 202 and 203 themselves may be partially formed on the pre-fabricated version of mission board 102, or may be entirely absent.

During finalization or customization of the pre-fabricated version of mission board 102, additive manufacturing techniques are employed to form (or finish) signal lines on the substrate of mission board 102 and/or form (or finish or modify) the connectors 201, 202 and 203. The mission board 102 is thus a component connection and interface structure for connecting and providing interoperability of a number of COTS components. The mission board is formed partially by a pre-fabricated structure including a substrate such as a PCB, CCA or the like. At least one region on the substrate is allocated for a connector configured to connect the structure with one of the COTS components and in the exemplary embodiment a number of such regions and connectors are employed. Likewise at least one region on the substrate is allocated for a signal line configured to carry a signal received at or transmitted from the connector (e.g., between connectors for different components), and in the exemplary embodiment a number of such signal lines are employed. The signal line(s) may be shielded (e.g., a twisted pair).

The pre-fabricated version of the mission board 102 may have just empty space where the connector is to be formed, or alternatively may have a partial connector structure where the final connector is to be located. The connector structure, if the connector is completely absent from the pre-fabricated version of the mission board 102, or a portion of the connector structure, if the connector is partially formed on the pre-fabricated version of the mission board 102, is formed by additive manufacturing. Dielectric (plastic) and conductive (metal) materials may be employed in forming the connector or connector portion, selected from materials suitable for formation by additive manufacturing. The materials of the connector or connector portion formed by additive manufacturing will generally differ in some respects from the materials used to form the pre-fabricated version of the mission board 102. Thus the final connector may be formed having a lower portion of one type of plastic and one type of metal, those suited for use in conventional formation of PCBs and the like, while an upper portion is formed of a different type of plastic and a different type of metal, those suited for use in additive manufacturing. Alternatively the entire connector may be formed entirely of the same type of plastic and the same type of metal, each suitable for use in additive manufacturing.

In like fashion, signal lines may be formed or completed by additive manufacturing on the pre-fabricated version of the mission board 102. The completed signal lines may be mixtures of different types of plastics and metals, or uniformly formed by plastic and metal suitable for additive manufacturing.

In the manner described, the pre-fabricated version of the mission board 102 may be modified by creating custom, additive printable cables, leads, and shielding to carry data, additively growing a connector to couple the cable to a device. In some embodiments, a cable or harness may be grown directly on top of an existing system structure on the pre-fabricated version of the mission board 102 in order to increase robustness and space utilization while reducing flex damage.

Figure 3A:
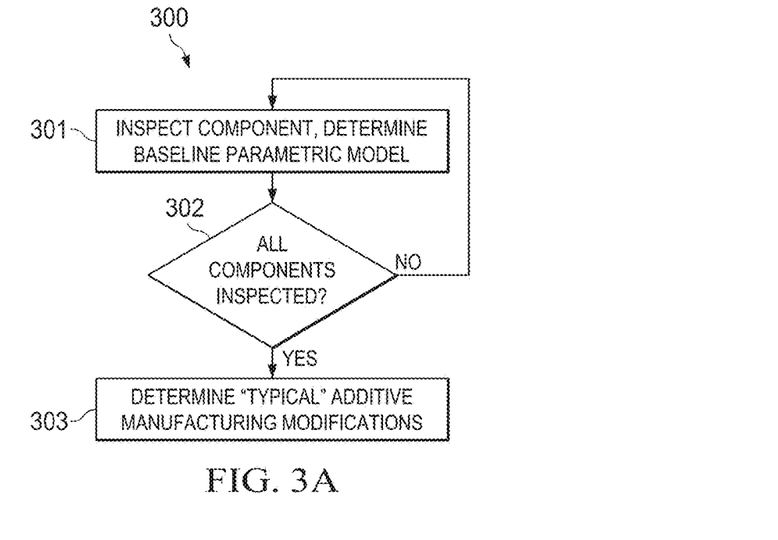
FIGS. 3A and 3B are high level flowcharts for a process of additive electrical and mechanical interface adaptation for interoperability with COTS components despite plug-and-play variances in accordance with embodiments of the present disclosure.
Figure 3B:
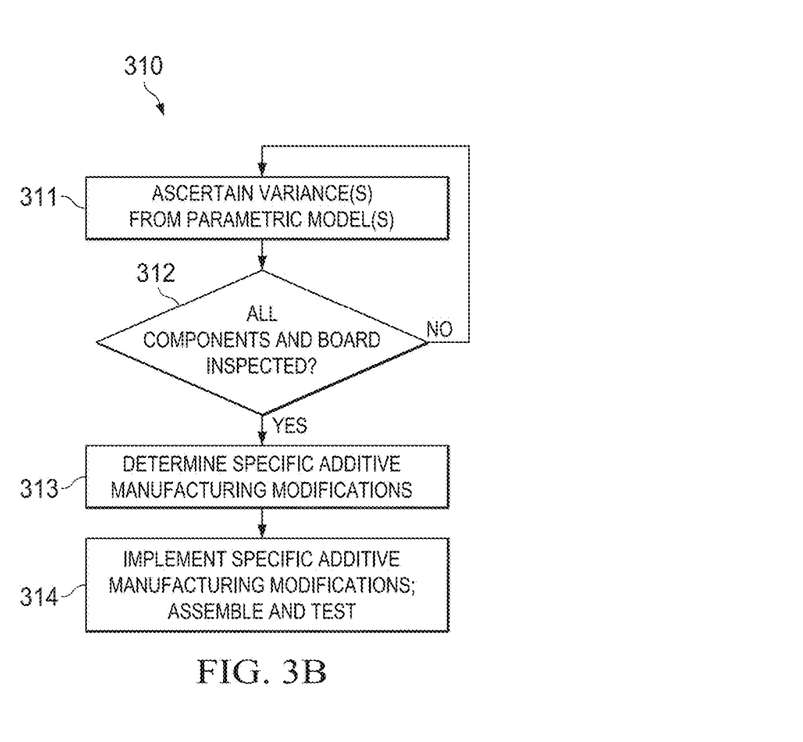

FIGS. 3A and 3B are high level flowcharts for a process of additive electrical and mechanical interface adaptation for interoperability with COTS components despite plug-and-play variances in accordance with embodiments of the present disclosure. While each process flow and/or event sequence depicted in the figures and described involves a sequence of steps and/or events, occurring either in series or in tandem, unless explicitly stated or otherwise self-evident (e.g., a signal cannot be received before being transmitted), no inference should be drawn regarding specific order of performance of steps or occurrence of events, performance of steps or portions thereof or occurrence of events serially rather than concurrently or in an overlapping manner, or performance the steps or occurrence of the events depicted exclusively without the occurrence of intervening or intermediate steps or events. Moreover, those skilled in the art will recognize that complete processes and event sequences are not illustrated or described. Instead, for simplicity and clarity, only so much of the respective processes and event sequences as is unique to the present disclosure or necessary for an understanding of the present disclosure is depicted and described.

The process 300 illustrated by FIG. 3A begins with ascertaining a baseline parametric model for a COTS component (step 301). After electing to utilize a COTS component from a particular supplier, a baseline parametric model of the component is developed, in particular for the interfaces noted above in connection with FIG. 2. The baseline parametric model may be developed using, for instance, 3D scanning to determine physical structure, robotic inspection to determine information about weight and center-of-gravity, a vision system to identify electrical connections and wiring, and electrical testing to determine output signal characteristics and tolerances for applied signals. The model may be developed by examining one or a plurality of instances of the COTS component form a given supplier. This inspection is performed for all of the different COTS components 105, 106, 107, 108 and 109 to be connected to or through the mission board (step 302), to develop models for each such component.

The baseline parametric model(s) developed by inspection of the components may then be employed to develop a set of "typical" additive manufacturing modifications to be made to the pre-fabricated version of mission board 102 (step 303). That is, the additive manufacturing modifications are "typical" in that a range (minimum and maximum) of modifications are identified as suitable for improving reliability of data transfer and/or interoperability of the various components 105, 106, 107, 108 and 109. These additive modifications may alter the wiring and/or connectors in the manner discussed above to ensure reliable data transfer from a particular COTS component to one or more other COTS components and/or to avoid interference between signals from one COTS component or between signals of multiple COTS components. Of course, a parametric model of the pre-fabricated version of mission board 102 is also developed (generally as part of the design of that board) and may be used in deriving the typical additive manufacturing modifications.

In implementing a specific instance of the system including the mission board design and COTS components, an examination of the specific instances of the mission board and the COTS components is preferably performed to determine lot-to-lot variances and corresponding specific additive modifications to a pre-fabricated version of mission board 102. This process 310, illustrated in FIG. 3B, begins with ascertaining variances of a specific instance of a COTS component from a baseline parametric model of the component (step 311). If the specific COTS components to be employed (identified by serial number or the like) have already been examined, data from such prior examination may be employed. Otherwise, the same equipment and processes, or a subset thereof, described above for inspection of components to develop a parametric model may be employed for ascertaining variances of a specific instance of a component or the pre-fabricated mission board. This examination is performed for all of the different COTS components 105, 106, 107, 108 and 109 and the mission board 102 (step 312), to determine what additive manufacturing modifications to the pre-fabricated version of the mission board 102 are appropriate to improve data transfer reliability and/or component interoperability (step 313). Of course, the steps of determining characteristics of the COTS components 105, 106, 107, 108 and 109 and then determining what additive manufacturing modifications should be made to the pre-fabricated version of the mission board 102 may be performed without development of a parametric model.

Once the specific additive manufacturing modifications for the pre-fabricated mission board 102 have been determined based on the specific instances of COTS components to be used with that board, those modifications are implemented, and the components are assembled and tested (step 314).

The economic advantages of employed COTS components may be increased by adapting to changes or variances in such components using additive print techniques. RF waveguides, printed circuit structures and the twisted pair technology described in the above-identified patent document make it possible to create an adaptive interface that accounts for some amount of product-to-product variation, routing conflicts and undocumented product design changes.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

To aid the Patent Office and any readers of any patent issued on this application in interpreting the claims appended hereto, applicants wish to note that they do not intend any of the appended claims or claim elements to invoke 35 U.S.C. §112(f) unless the words "means for" or "step for" are explicitly used in the particular claim.

What is claimed is:

1. An apparatus, comprising:
  a pre-fabricated component connection and interface structure having:
    a substrate,
    a first region on the substrate for at least one connector that is configured to connect the structure with a commercial, off-the-shelf component, and
    a second region on the substrate for at least one signal line that is configured to carry a signal received at or transmitted from the at least one connector; and
  one or more additional structures comprising a material suitable for use in additive manufacturing and formed on at least one of:
    a portion of the at least one connector when the portion of the at least one connector is disposed on the first region, and
    a portion of the at least one signal line when the portion of the at least one signal line is disposed on the second region;
  wherein the one or more additional structures are formed by additive manufacturing to modify the apparatus to include at least one of: the at least one connector and the at least one signal line.

2. The apparatus according to claim 1, wherein the pre-fabricated component connection and interface structure comprises the portion of the at least one signal line, wherein the one or more additional structures comprise another portion of the at least one signal line, and wherein a structure of the at least one signal line improves reliability of data transfer over the at least one signal line.

3. The apparatus according to claim 2, wherein at least part of the at least one signal line is shielded.

4. The apparatus according to claim 1, wherein the one or more additional structures comprise another portion of the at least one signal line, and wherein a structure of the at least one signal line improves reliability of data transfer over the at least one signal line.

5. The apparatus according to claim 1, wherein the pre-fabricated component connection and interface structure comprises the portion of the at least one connector, wherein the one or more additional structures comprise another portion of the at least one connector, and wherein a structure of the at least one connector reduces interference between signals transmitted over the at least one connector.

6. The apparatus according to claim 1, wherein the one or more additional structures comprise another portion of the at least one connector, and wherein a structure of the at least one connector reduces interference between signals transmitted over the at least one connector.

7. The apparatus according to claim 1, wherein the pre-fabricated component connection and interface structure includes the portion of the at least one connector, wherein the one or more additional structures form a remainder of the at least one connector, and wherein the portion of the at least one connector includes a partial connector structure onto which the remainder is formed.

8. The apparatus according to claim 1, wherein the pre-fabricated component connection and interface structure includes the portion of the at least one signal line, wherein the one or more additional structures form a remainder of the at least one signal line, and wherein the portion of the at least one signal line includes a partial signal line structure onto which the remainder is formed.

9. A system comprising:
a commercial, off-the-shelf component; and
an apparatus comprising:
  a pre-fabricated component connection and interface structure having:
    a substrate,
    a first region on the substrate for at least one connector that is configured to connect the structure with the commercial, off-the-shelf component, and
    a second region on the substrate for at least one signal line that is configured to carry a signal received at or transmitted from the at least one connector; and
  one or more additional structures comprising a material suitable for use in additive manufacturing and formed on at least one of:
    a portion of the at least one connector when the portion of the at least one connector is disposed on the first region, and
    a portion of the at least one signal line when the portion of the at least one signal line is disposed on the second region;
  wherein the one or more additional structures are formed by additive manufacturing to modify the apparatus to include at least one of: the at least one connector and the at least one signal line.

10. The system according to claim 9, further comprising:
a sandwich frame configured to hold the commercial, off-the-shelf component in stacked relation to the component connection and interface structure with at least one connector on the commercial, off-the-shelf component mated to the at least one connector on the apparatus.

11. A method, comprising:
providing a pre-fabricated component connection and interface structure having:
  a substrate,
  a first region on the substrate for at least one connector that is configured to connect the structure with a commercial, off-the-shelf component, and
  a second region on the substrate for at least one signal line that is configured to carry a signal received at or transmitted from the at least one connector; and
forming, by additive manufacturing, one or more additional structures on at least one of:
  a portion of the at least one connector when the portion of the at least one connector is disposed on the first region, and
  a portion of the at least one signal line when the portion of the at least one signal line is disposed on the second region,
wherein the one or more additional structures comprise a material suitable for use in additive manufacturing, and
wherein the one or more additional structures are formed by additive manufacturing to modify an apparatus to include at least one of: the at least one connector and the at least one signal line.

12. The method according to claim 11, wherein the pre-fabricated component connection and interface structure comprises the portion of the at least one signal line, wherein the one or more additional structures comprise another portion of the at least one signal line, and wherein a structure of the at least one signal line improves reliability of data transfer over the at least one signal line.

13. The method according to claim 12, wherein at least part of the at least one signal line is shielded.

14. The method according to claim 11, wherein the one or more additional structures comprise another portion of the at least one signal line, and wherein a structure of the at least one signal line improves reliability of data transfer over the at least one signal line.

15. The method according to claim 11, wherein the pre-fabricated component connection and interface structure comprises the portion of the at least one connector, wherein the one or more additional structures comprise another portion of the at least one connector, and wherein a structure of the at least one connector reduces interference between signals transmitted over the at least one connector.

16. The method according to claim 11, wherein the one or more additional structures comprise another portion of the at least one connector, and wherein a structure of the at least one connector reduces interference between signals transmitted over the at least one connector.

17. The method according to claim 11, wherein the pre-fabricated component connection and interface structure includes the portion of the at least one connector, wherein the one or more additional structures form a remainder of the at least one connector, and wherein the portion of the at least one connector includes a partial connector structure onto which the remainder is formed.

18. The method according to claim 11, wherein the pre-fabricated component connection and interface structure includes the portion of the at least one signal line, wherein the one or more additional structures form a remainder of the at least one signal line, and wherein the portion of the at least one signal line includes a partial signal line structure onto which the remainder is formed.

19. The method according to claim 11, further comprising:
 connecting the at least one connector to the commercial, off-the-shelf component.

20. The method according to claim 19, further comprising:
 providing a sandwich frame holding the commercial, off-the-shelf component in stacked relation to the component connection and interface structure with at least one connector on the commercial, off-the-shelf component mated to the at least one connector on the apparatus.

* * * * *